United States Patent [19]

Liu

[11] 4,376,679
[45] Mar. 15, 1983

[54] SOLAR DESALTING PROCESS

[75] Inventor: Philip J. Liu, Germantown, Wis.

[73] Assignee: Aqua-Chem, Inc., Milwaukee, Wis.

[21] Appl. No.: 306,211

[22] Filed: Sep. 28, 1981

Related U.S. Application Data

[62] Division of Ser. No. 172,089, Jul. 25, 1980, Pat. No. 4,330,373.

[51] Int. Cl.³ .............................................. B01D 3/06
[52] U.S. Cl. ...................................... 203/71; 159/47.1; 203/10; 203/88; 203/DIG. 1; 203/DIG. 17
[58] Field of Search ...................... 203/10, DIG. 1, 21, 203/88, 71, 72, 81, DIG. 17; 202/173, 174, 234; 159/2 MS, 17 R, DIG. 8, 47 R

[56] References Cited

U.S. PATENT DOCUMENTS 3,351,120 11/1967 Goeldner et al. ................... 202/174
3,941,663 3/1976 Steinbruchel ....................... 202/174
3,948,734 4/1976 Kohl et al. .......................... 202/173
4,211,613 7/1980 Meckler ........................ 203/DIG. 1

*Primary Examiner*—Frank Sever

[57] ABSTRACT

A solar desalting method and apparatus includes a storage tank for receiving heated sea water at a first rate from a solar collector during daylight hours and for delivering the same to a flash evaporator a second rate. The flash evaporator is connected for delivery of the evaporated and unevaporated portions of the feed water as the heating vapor and feed liquid, respectively, to a serially connected multi-effect film evaporator. Sea water is used to condense the vapor from the last evaporator effect as the distillate product of the system. The storage tank permits nighttime operation with the brine from the last effect and a portion of the cooling water being fed to the solar collector during the daytime and discharged at night.

3 Claims, 1 Drawing Figure

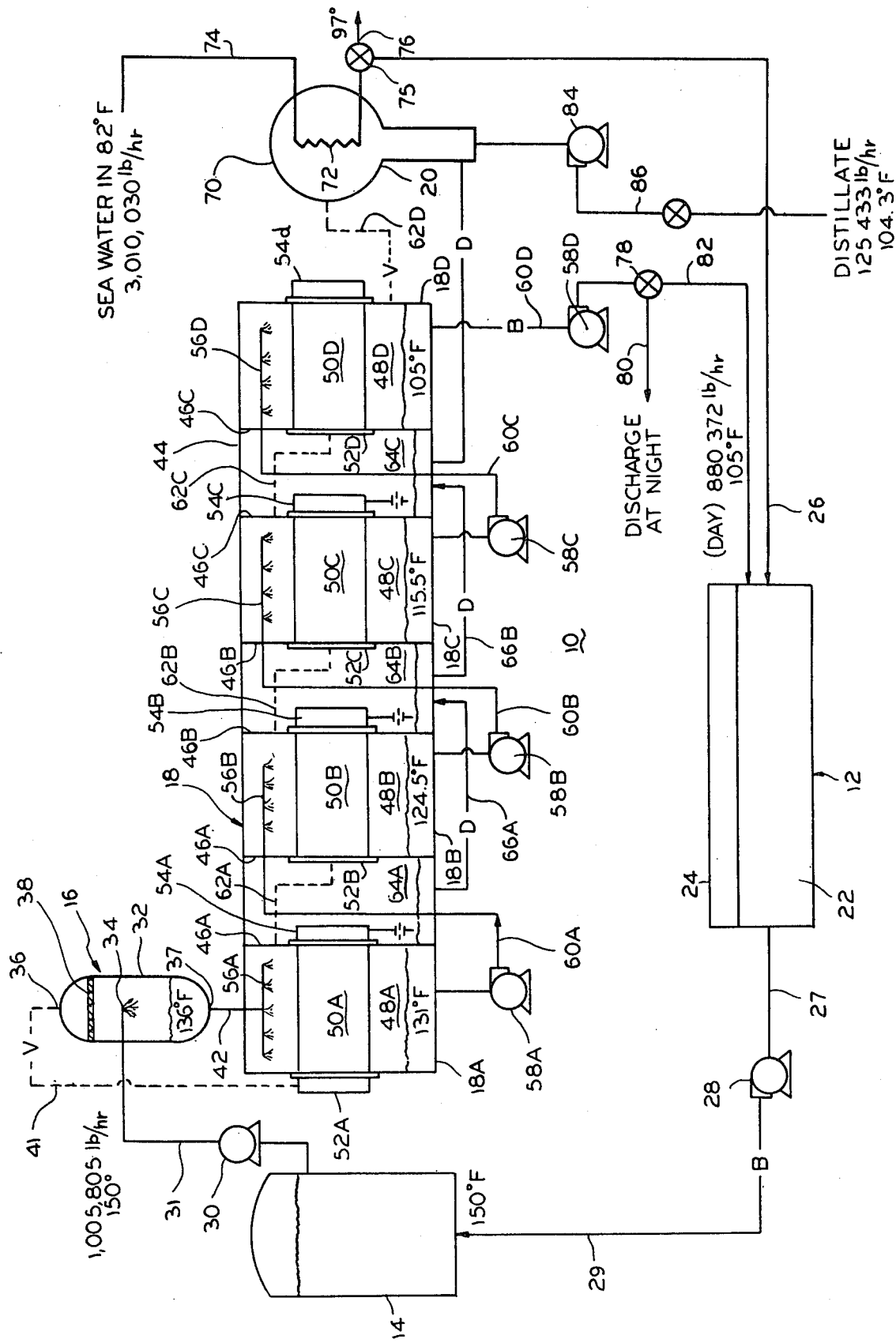

SOLAR DESALTING PROCESS

This is a division of application Ser. No. 172,089, filed July 25, 1980, now U.S. Pat. No. 4,330,373.

BACKGROUND OF THE INVENTION

This invention relates to a solar desalting method and apparatus.

The use of solar energy as the heat source in a sea water desalting method and apparatus has been suggested. In such prior art systems, the temperature elevation in the solar collector has been relatively low, on the order of 10° F. As a result, a relatively high flow rate was required to provide the necessary heat to the evaporator system. Such relatively large flow rate requirements render nighttime operation of such systems impractical.

SUMMARY OF THE INVENTION

It is an object of the invention to provide a new and improved method and apparatus for evaporation by means of solar energy.

Another object of the invention is to provide a sea water desalting method and apparatus which can operate both during periods of sunshine and at night.

A further object of the invention is to provide a solar sea water desalting method and apparatus wherein relatively lower feed water flow rates may be obtained.

These and other objects and advantages of the present invention will become more apparent from the detailed description thereof taken with the accompanying drawing.

According to one of its aspects the invention comprises a distilling apparatus including: a solar collector having an inlet and an outlet; an storage tank having a capacity greater than that of the solar collector; first liquid transfer means connected to the outlet of the solar collector and to said storage means for delivering heated liquid from the solar collector to the storage means at a first rate; a flash evaporator; second liquid transfer means connecting the storage tank to the flash evaporator for delivering the stored feed liquid to the flash evaporator at a second rate which is lower than the first rate; the flash evaporator being maintained at a temperature lower than the heated feed liquid whereby a portion of the liquid evaporates; a multi-effect evaporator; vapor delivery means connecting the flash evaporator to the film evaporator for delivering the vaporized portion of the feed liquid from the flash evaporator as the vapor input to the multi-effect evaporator; third liquid transfer means for delivering the unevaporated portion of the feed liquid from the flash evaporator as the liquid input to the multi-effect evaporator; the successive effects of said multi-effect evaporator being connected and arranged so that the vapor generated in each effect comprises the heat input to the next succeeding effect whereby successive portions of the feed liquid are evaporated and condensed; and distillate collecting means for collecting distillate from the last effect as the product of the system.

According to another of its aspects the invention comprises a method of distilling liquids including the steps of passing the liquid through a solar collector at a first rate during daylight hours for elevating the temperature thereof; storing the heated liquid; passing the stored liquid at a second rate which is lower than said first rate to a flash evaporator; flash evaporating a part of the liquid in the flash evaporator and collecting the unevaporated part; maintaining the effects of a multi-effect evaporator at successively lower temperatures; passing the vaporized part of the liquid to one surface of the heat exchange tubes of the first effect of said multi-effect evaporator and delivering the unevaporated part of the liquid to the other surface of the heat exchange tubes for condensing said vapor whereby a further part of the unevaporated liquid evaporates; successively passing the vapor generated in each effect and the unevaporated liquid to the heat exchange tubes of the next lower temperature effect; and collecting the condensate from the effects and condensing the vapor from said lowest temperature effect as the product of the system.

BRIEF DESCRIPTION OF THE DRAWING

The single FIGURE of the drawing schematically illustrates the solar desalting apparatus of the present invention.

DESCRIPTION OF THE PREFERRED EMBODIMENT

The drawing shows a system 10 for converting sea water or brine to fresh water and employing solar energy. More particularly, the system 10 includes a solar collector 12 for heating the feed water prior to the delivery thereof to a storage tank 14. The outlet of tank 14 is coupled to a flash evaporator 16 where a portion of the feed water evaporates and is transferred as the heat source to a multi-stage flash evaporator 18. The unevaporated portion of the feed water is also transferred to the evaporator 18 as the feed water thereof. A condenser 20 is connected to receive the vapor from the last effect of evaporator 18 for condensing as a part of the system's product water.

The solar collector 12 may be of any convenient type, and may for example comprise a large shallow container 22 positioned to receive direct sunlight and a transparent cover 24 of glass or plastic to admit sunlight and prevent evaporation. The inlet of container 22 is connected by pipe 26 to the condenser 20 and the outlet of container 22 is connected by pipe 27 to the inlet of a pump 28 the outlet of which is connected by pipe 29 to storage tank 14.

The flash evaporator 16 may also be conventional and is schematically illustrated to include a tank 32 having an inlet spray nozzle 34 intermediate its ends, a vapor outlet 36 adjacent its upper end and a brine outlet 37 adjacent its lower end. A demister 38 is disposed between the spray nozzle 34 and vapor outlet 36. As those skilled in the art will appreciate, a flash evaporator is a distiller in which heated liquid is introduced into an open chamber under reduced pressure resulting in partial evaporation. Pipes 41 and 42 respectively connect the vapor outlet 36 and the brine outlet 37 of flash evaporator 16 to the film evaporator 18 as will be more fully described below.

Evaporator 18 is a multi-effect film evaporator which includes a shell 44 having partitions 46 for dividing the shell into a plurality of evaporator effects 18A, 18B, 18C and 18D. The effects 18A, 18B, 18C and 18D are identical and accordingly only effect 18A will be discussed in detail for the sake of brevity. Corresponding parts of each of the effects 18A, 18B, 18C and 18D are identified by the same reference numerals but distinguished by the letters A, B, C or D.

Evaporator effect 18A includes a chamber 48A which is defined by the shell 44 and the partitions 46. A heat exchange tube bundle 50A is disposed within chamber 48A and may include plurality of generally horizontally extending heat exchange tubes which are connected at one end to a vapor chamber 52A and their other ends to a condensate collector 54A. Disposed above the heat exchange tube bundle 50A is a spray manifold 56A having a plurality of downwardly directed nozzles for distributing liquid over the outer surfaces of the heat exchange tubes of bundle 50A. A pump 58A and conduit 60A connect the lower end of chamber 48A to the spray manifold 56B of effect 18B and pumps 58B and 58C and pipes 60B and 60C, respectively, similarly connect the lower ends of chambers 48B and 48C to the spray manifolds 56C and 56D of effects 18C and 18D. In addition, conduit 62A connects the upper end of chamber 48A to the vapor chamber 52B of effect 18B. Similarly, conduits 62B and 62C respectively connect the upper ends of chambers 48B and 48C to the vapor chambers 52C and 52D of effects 18C and 18D, respectively. Partitions 46A, 46B and 46C respectively define condensate collecting chambers 64A, 64B and 64C in effects 18A, 18B and 18C. In additions conduits 66A and 66B serially connect the condensate collecting chambers 64A, 64B and 64C.

Condenser 20 comprises a heat exchanger having an outer shell 70 and a heat exchange coil 72. The inlet of coil 72 is connected by conduit 74 for receiving fresh sea water and its outlet is connected to a valve 75 which in turn is connected to a first pipe 26 to the solar collector 12 and by a second pipe 76 to discharge. Valve 75 is cycled for delivering a portion of the cooling water to the solar collector 12 during daylight while all the cooling water is discharged at night. The chamber 48D is connected by conduit 62D to condenser chamber 70, while pump 58D and conduit 60D connect the lower end of chamber 48D to a valve 70 which in turn is connected by conduits 80 and 82 to discharge and the solar collector 12, respectively.

In operation of the desalting apparatus shown in the drawing, fresh sea water is delivered by intake pipe 74 to condenser 76 where its temperature is elevated prior to delivery to the solar collector 12. The sea water passing through solar collector 12 is further heated prior to delivery by pump 28 to the storage tank 14. It will be appreciated that the delivery of fresh sea water to solar collector 12 will continue only during daylight hours. Accordingly, storage tank 14 must have a capacity sufficient to store heated feed water for use during the nighttime hours.

The heated feed water is delivered from storage tank 14 by pump 30 and conduit 31 to the spray nozzle 34 of the flash evaporator 16. The temperature in the tank 32 of flash evaporator 16 will be lower than the temperature of the feed water and, accordingly, a portion of the feed water will vaporize and the remainder will collect in the lower end of the tank. The vaporized portion of the feed water is delivered by conduit 41 to the steam chest 52A of effect 18A for passage through the heat exchange tubes 50A. Simultaneously, the unevaporated portion of the feed water is withdrawn from the lower end of tank 32 and delivered by pipe 42 to the spray manifold 56A for being sprayed over the outer surfaces of the tubes of heat exchanger 50A. The vapor within the heat exchange tubes will condense to release its heat of vaporization to the liquid contacting the outer surface of the tubes whereby a portion of the liquid evaporates and the remainder collects in the lower end of chamber 48A. The vaporized portion of the liquid is conducted by conduit 62A to the steam chest 52B of evaporator 18B and the unevaporated portion of this liquid is delivered by pump 58A and conduit 68 to the spray manifold 56B of effect 18B. In a similar manner, the unevaporated liquid in the lower ends of chambers 48B and 48C are delivered to the spray manifolds 56 of the next lowest effect and evaporated feed liquid is provided as the heating steam to the heat exchange tubes of said next lowest effect. In addition, the condensate from the interior of heat exchange tubes 50A is collected in condensate collecting chamber 64A and is serially flashed down through each of the condensate collecting chambers 64B and 64C with the condensate from chamber 54C being delivered to the condenser 20. The condensate from condenser 20 is removed by condensate pump 84 and pipe 86 as the product water of the system.

In one specific example of the method according to the invention, sea water is delivered to condenser 20 at a temperature of 82° F. and at 3,010,030 lbs. per hour. The feed water exits the condenser 20 at 97° F. and during daylight hours a portion is delivered to the solar collector 12 where it is further heated to 150° F. prior to delivery to storage tank 14. The feed water is then delivered from storage tank 14 to flash evaporator 16 at a rate of 1,005,805 lbs. per hour and a temperature of 150° F. Feed water is delivered from flash evaporator 16 to the first spray manifold 56A at a temperature of 136° F. and the temperatures of the chambers 48A, 48B, 48C and 48D are respectively 131° F., 124° F., 115° F. and 105° F. Also during daylight hours, brine from the last effect 18D is delivered to the solar collector 12 at the rate of 880,372 lbs. per hour at a temperature of 105° F. Distillate is collected from the condenser 20 at the rate of 125,433 lbs. per hour and a temperature of 104.3° F.

Because of the relatively large temperature rise in the solar collector 12, that is, about 45° F., the size of storage tank 14 can be substantially smaller than that required in prior art systems. This heat rise is limited only by the heat loss of the high temperature water in the solar collector 12. Also, because of this substantial temperature rise, is not necessary to store the brine from the last effect 18D during nighttime hours. This further reduces the storage requirements of the system.

While the single embodiment of the present invention has been illustrated and described, it is not intended to be limited thereby but only by the scope of the appended claims.

I claim:

1. A method of distilling an impure liquid comprising the steps of:
   passing the liquid through an energy input means consisting of a solar collector at a first rate during daylight hours for elevating the temperature thereof,
   storing said heated liquid in a storage tank having a capacity greater than that of the solar collector, passing said stored liquid at a second rate which is lower than said first rate to a flash evaporator,
   flash evaporating a part of said liquid in said flash evaporator at a temperature which is lower than that of said stored liquid and collecting the unevaporated part,
   providing a multi-evaporator, maintaining the effects of said multi-effect evaporator at successively lower temperatures, each effect of said multi-effect evaporator having heat exchange tubes, passing the vaporized part of said liquid from said flash evaporator to one surface of the heat exchange tubes of the first effect of said multi-effect evaporator and delivering the unevaporated part of the liquid to the other surface of said heat exchange tubes for condensing said vapor whereby a further part of the unevaporated liquid evaporates, successively passing the vapor generated in each effect and the unevaporated liquid to the heat exchange tubes of the next lower temperature effect, collecting the condensate from the effects and condensing the vapor from said lowest temperature effect as the products of the system, recirculating at least a portion of the unevaporated feed liquid of said multi-effect evaporator to said solar collector during daylight hours, and discharging said unevaporated feed liquid during nighttime hours.

2. A method of distilling an impure liquid comprising the steps of:

heating the liquid in a solar collector during daylight hours for elevating the temperature thereof;

providing a storage container, transferring said heated liquid to said storage container, passing said stored liquid to a flash evaporator, providing a flash evaporator, flash evaporating a part of said liquid in said flash evaporator and collecting the unevaporated part, providing a multi-effect film evaporator, maintaining the effects of said multi-effect film evaporator at successively lower temperatures, passing the vaporized part of said liquid from said flash evaporator to the first effect of said multi-effect film evaporator as the vapor input thereof and delivering the unevaporated part of the liquid to the first effect as the feed liquid thereof for condensing said vapor whereby a further part of the unevaporated liquid evaporates, successively passing the vapor generated in each effect and the unevaporated liquid to the next lower temperature effect, and collecting the condensate from the effects and condensing the vapor from said lower temperature effect as the product of the systems, recirculating at least a portion of the unevaporated feed liquid of said multi-effect evaporator to said solar collector during daylight hours, and discharging said unevaporated feed liquid during nighttime hours.

3. The method of claims 1 or 2, wherein the temperature rises in said solar collector about 25°–50° F.

* * * * *